(12) United States Patent
Konz (10) Patent No.: US 7,894,562 B2
(45) Date of Patent: *Feb. 22, 2011

(54) DATA MESSAGE SYNC PATTERN

(75) Inventor: Daniel W. Konz, Florissant, MO (US)

(73) Assignee: The Boeing Company, Chicago, IL (US)

( * ) Notice: Subject to any disclaimer, the term of this patent is extended or adjusted under 35 U.S.C. 154(b) by 1105 days.

This patent is subject to a terminal disclaimer.

(21) Appl. No.: 10/842,326

(22) Filed: May 10, 2004

(65) Prior Publication Data

US 2005/0249323 A1 Nov. 10, 2005

(51) Int. Cl.
H04L 7/02 (2006.01)

(52) U.S. Cl. .................. 375/361; 375/122; 375/257; 375/333

(58) Field of Classification Search ............. 375/361
See application file for complete search history.

(56) References Cited

U.S. PATENT DOCUMENTS

| | | | | |
|---|---|---|---|---|
| 4,199,663 A | * | 4/1980 | Herzog | 370/445 |
| 4,730,188 A | * | 3/1988 | Milheiser | 340/825 |
| 6,980,500 B2 | * | 12/2005 | Lu et al. | 369/59.17 |
| 7,012,935 B2 | * | 3/2006 | Woelk et al. | 370/503 |
| 7,145,852 B2 | | 12/2006 | Lin et al. | |
| 2003/0214975 A1 | * | 11/2003 | Woelk et al. | 370/503 |
| 2005/0069041 A1 | * | 3/2005 | Lincoln | 375/257 |
| 2005/0249323 A1 | | 11/2005 | Konz | |
| 2006/0002489 A1 | * | 1/2006 | Zuhdi et al. | 375/282 |

OTHER PUBLICATIONS

Manchester encoding:opposing definions resolved by Roger Foster. Engineering Science and Education Journal Dec. 2000.*
Forster, Roger, "Manchester Encoding: Opposing Definitions Resolved," Engineering Science and Education Journal, Dec. 2000, pp. 278-280.

* cited by examiner

Primary Examiner—Shuwang Liu
Assistant Examiner—Dhaval Patel
(74) Attorney, Agent, or Firm—Harness, Dickey & Pierce, P.L.C.

(57) ABSTRACT

Data message sync patterns for use in a network that utilizes Manchester (Bi-Phase) signal encoding with an embedded sync pattern. The sync pattern of the invention differs from conventional sync patterns for Manchester (Bi-Phase) type signal encoding, allowing greater deviation of the local oscillators in the communication network without increase in the communication network bandwidth.

12 Claims, 8 Drawing Sheets

DATA MESSAGE SYNC PATTERN

This specification includes a computer program listing appendix contained on a compact disc, said computer program listing appendix being incorporated-by-reference herein. There are two compact discs which are identical: labeled Copy 1 and Copy 2. The names of the files on each disc are "ib_rcvr.vhd" and "ib_xmit.vhd"; the date of creation of the files was Mar. 16, 2004; the sizes of the files are 29 kb and 22 kb, respectively.

FIELD OF THE INVENTION

The present invention relates to a data message sync pattern, and more specifically an improved data message sync pattern for use in a network that utilizes Manchester (Bi-Phase) signal encoding with an embedded sync pattern.

BACKGROUND OF THE INVENTION

The IntelliBus protocol first implemented in 1999 utilizes a Manchester (Bi-Phase) type signal encoded messaging format to transfer data over a network. The message format comprises a sync pattern plus a Manchester encoded 18-bit word. The sync pattern is used to identify the beginning of each 18 bit word, and the sync pattern identifies that word as either a command or data word. Traditionally sync patterns for Manchester encoded words in communication systems are 3 data bit-times wide. The sync patterns are invalid data patterns and were either 1½ bit periods constant high signal followed by 1½ bit periods constant low signal, or 1½ bit period constant low signal followed by 1½ bit periods constant high signal.

Current systems oversample the asynchronous data patterns and use algorithms to find the sync patterns in the Manchester encoded signals. However, the length of time from the center to the end of the sync pattern limits the amount of frequency deviation from the expected rate that a receiver can tolerate. Thus, the sync pattern itself is the weakest part of the message decoding, and therefore sets the maximum-amount of deviation permitted.

It is desirable to be able to receive and transmit Manchester encoded data words on a communication network asynchronously, meaning that no communication clock signal needs to be transmitted with the Manchester encoded data. This places the burden of recognizing the beginning of a data word, and correctly receiving each bit of the word, on each receiving node in the communication system even in the presence of distortion, or apparent distortion, of the received data signal. Apparent distortion can be caused by a mismatch of the frequencies of the expected transmit and receive frequencies in the communication system, or by duty cycle skew in the receiver or transmitter. Yet another form of distortion can be caused by undesirable interfering noise signals added to the desired data signal. Noise sources can be from reflections on the network cable, crosstalk between network cable pairs, or other forms of conducted or radiated noise signals.

In order to receive data words in the presence of a mismatch in expected data rate between a transmitter and receiver node, it is advantageous for the receiving node to oversample the received data signal and look for the crossings between the high and low portions of the received data signals. The receiver then makes a decision on where the beginning of the word is located, and whether the data bits are valid and should be saved to a register or other memory.

It is also desirable that the network signals not contain a DC component. This allows the network signals to be passed through transformers, capacitors, or radio links, as required.

Traditional sync patterns used in Manchester encoded communication systems limit the frequency deviation that can be tolerated between the transmitter and receiver. The present invention comprises an improved set of sync patterns that allow greater mismatch in data frequency between the transmitting and receiving network nodes for a given oversampling rate.

SUMMARY OF THE INVENTION

The sync patterns of the present invention allow greater deviation of the local oscillators in the communication system from the nominal frequency, while maintaining the absence of a DC component to the signals and using no additional communication system bandwidth.

This invention changes the shapes of the sync patterns at the start of the Manchester encoded data words as compared to the traditional shapes so that for a given oversampling rate the maximum allowable frequency mismatch between the transmitter and receiver for the sync pattern is the same as for the bit patterns in the rest of the word. The sync patterns of this invention are similar to the traditional sync patterns, but have extra transitions that allow the receiver logic to correctly identify the sync patterns in the presence of greater frequency deviation than for the traditional sync patterns.

The sync patterns of the invention have no DC component so that the signals can pass through transformers, capacitors or RF links, or any other transmission medium that cannot pass a DC or very low frequency signal. Moreover, the sync patterns of the invention are no longer in time than the traditional sync patterns, so that there is no decrease in the amount of data that can be moved in the communication system when compared to a system using a traditional sync pattern.

This invention can be used on any network application that utilizes Manchester (Bi-Phase) type signal encoding with an embedded sync pattern.

Further features and advantages of the present invention, as well as the structure and operation of various embodiments of the present invention, are described in detail below with reference to the accompanying drawings.

BRIEF DESCRIPTION OF THE DRAWINGS

With reference to FIG. 4, there is shown waveforms 30, 32 illustrating sync patterns in accordance with the present invention for use with Manchester encoding where the sync pattern is detected when the received signal goes low for 1 bit period, followed by the received signal going high for 1½ bit periods, followed by the received signal going low for ½ bit period. In FIG. 5 there is shown sync patterns in accordance with the present invention for use with Manchester encoded signals where the sync pattern is detected when the received signal goes high for 1 bit period, followed by the received signal going low for a 1½bit period, followed by the sync pattern going high for a ½ bit period.

DETAILED DESCRIPTION OF PREFERRED EMBODIMENTS

Figure 1:
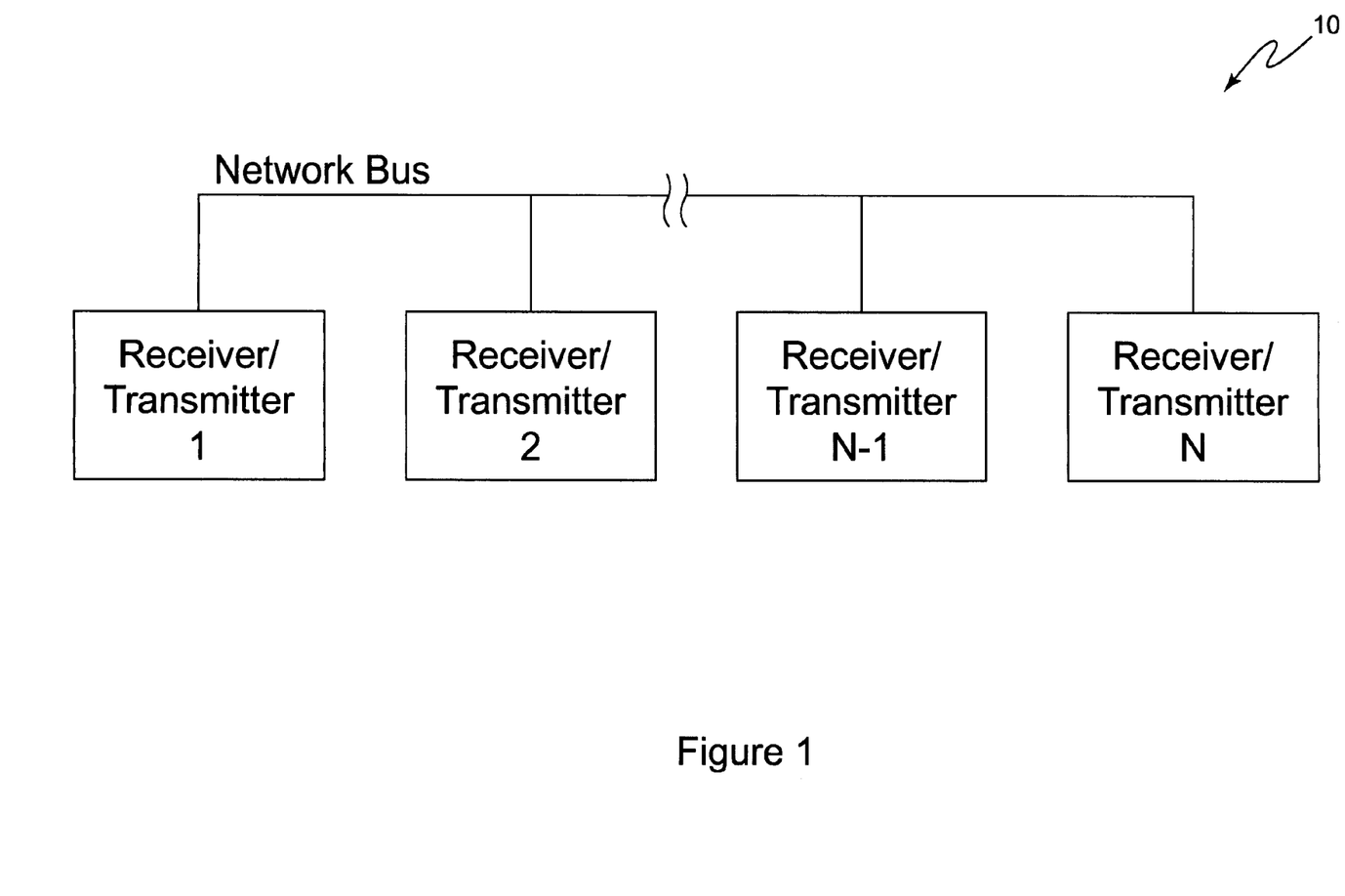
FIG. 1 is a block diagram of a typical network that may utilize the data message sync pattern of the present invention.

With reference to FIG. 1 of the drawing, there is shown a typical network bus 10 that may utilize Manchester (Bi-Phase) type signal encoding with an embedded sync pattern in accordance with the present invention. Such a typical network bus has a plurality of receiver/transmitter nodes N that receive and transmit data over the Manchester-type signal encoded network.

Figure 2:
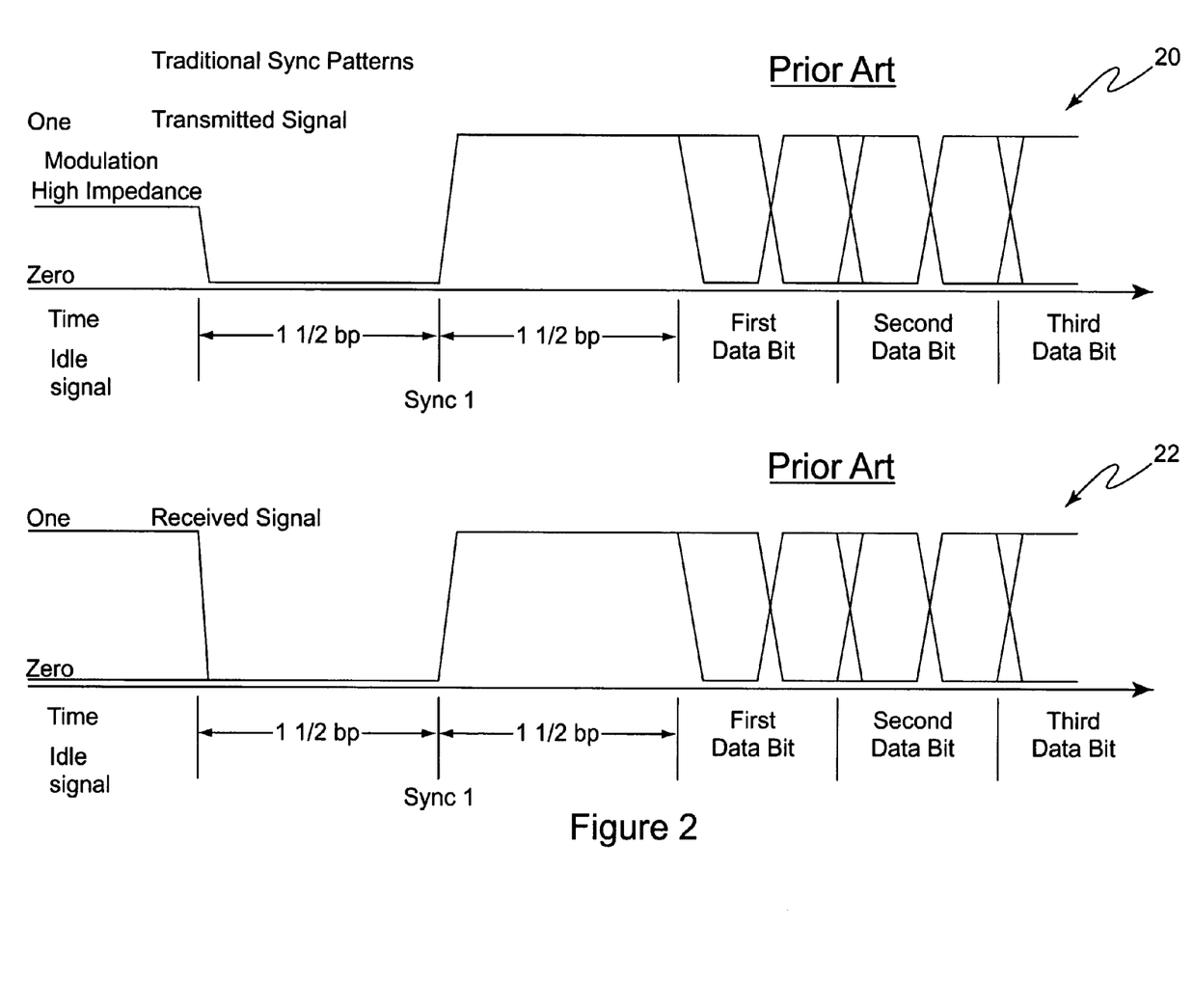
FIGS. 2 and 3 are waveforms illustrating prior art sync patterns.
Figure 3:
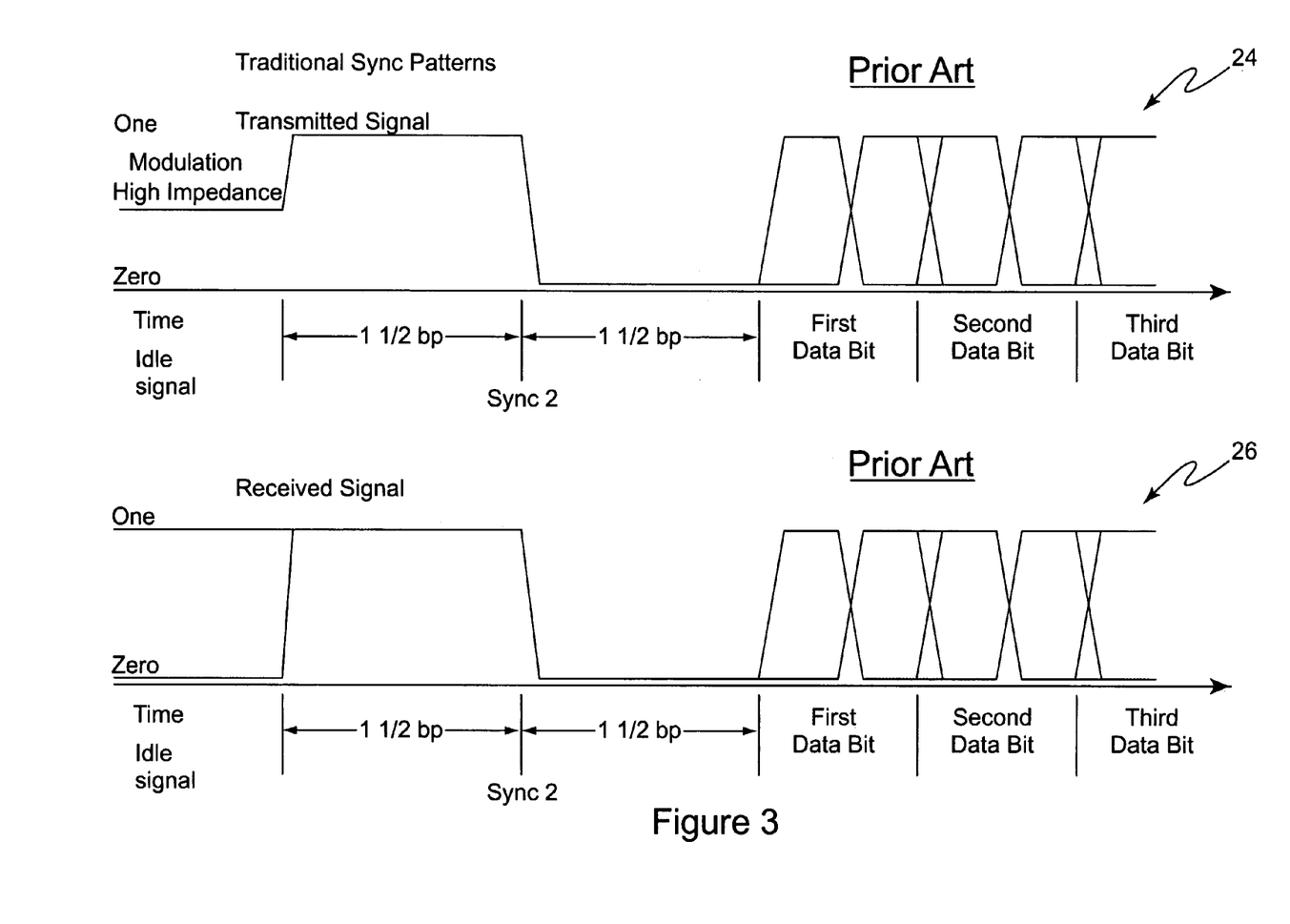

FIGS. 2 and 3 illustrate prior art (traditional) sync patterns for a Manchester signal encoded network. FIG. 2 illustrates waveforms 20, 22 where the sync pattern is detected when the received signal goes low for 1½ bit periods, followed by the received signal going high for 1½ bit periods. FIG. 3 illustrates prior art Manchester-type sync pattern waveforms 24, 26 where the sync pattern is detected when the received signal goes high for 1½ bit periods followed by the received signal going low for 1½ bit periods.

Figure 4:
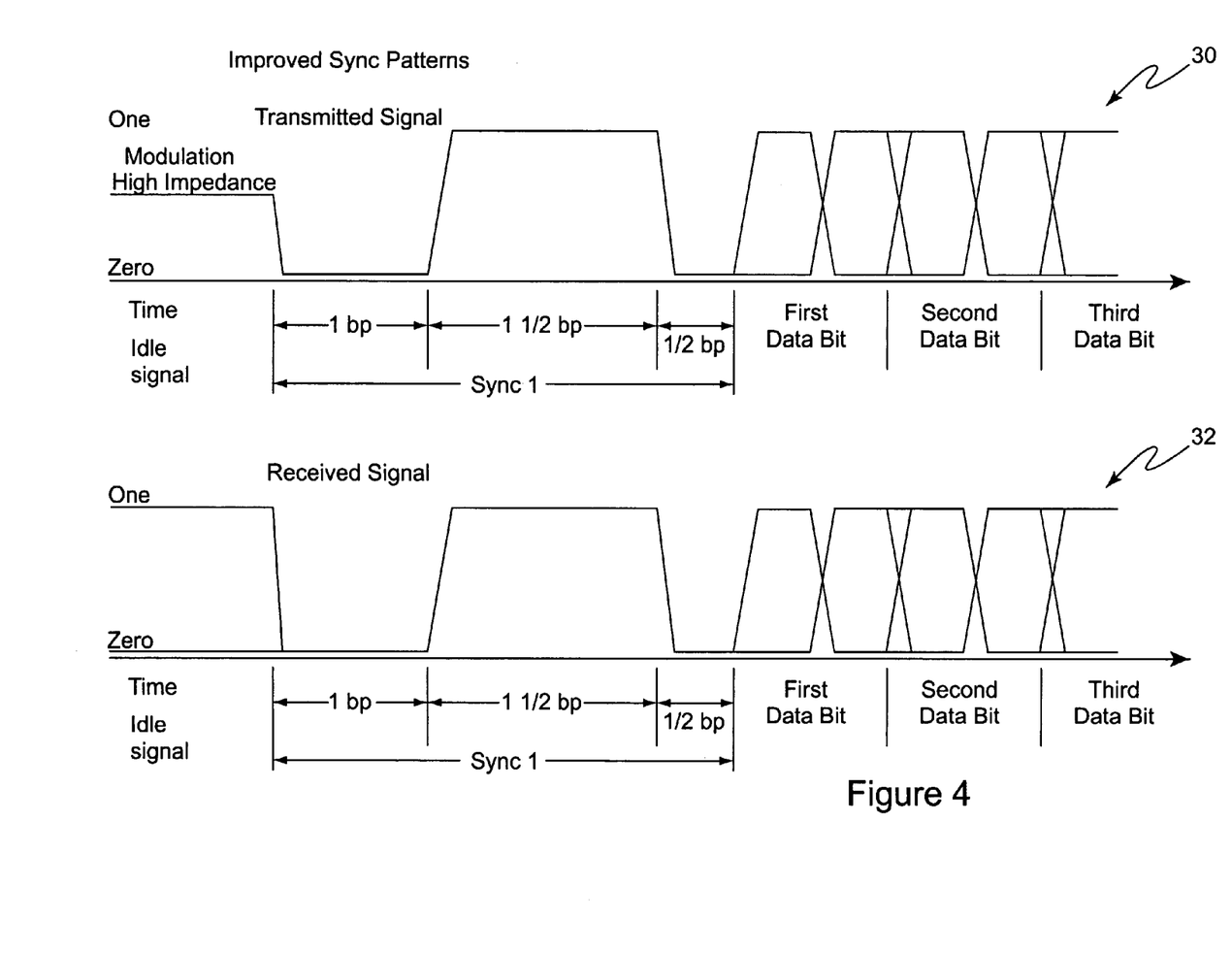
FIGS. 4 and 5 illustrate-sync patterns in accordance with various embodiments of the present invention for use with Manchester encoding.
Figure 5:
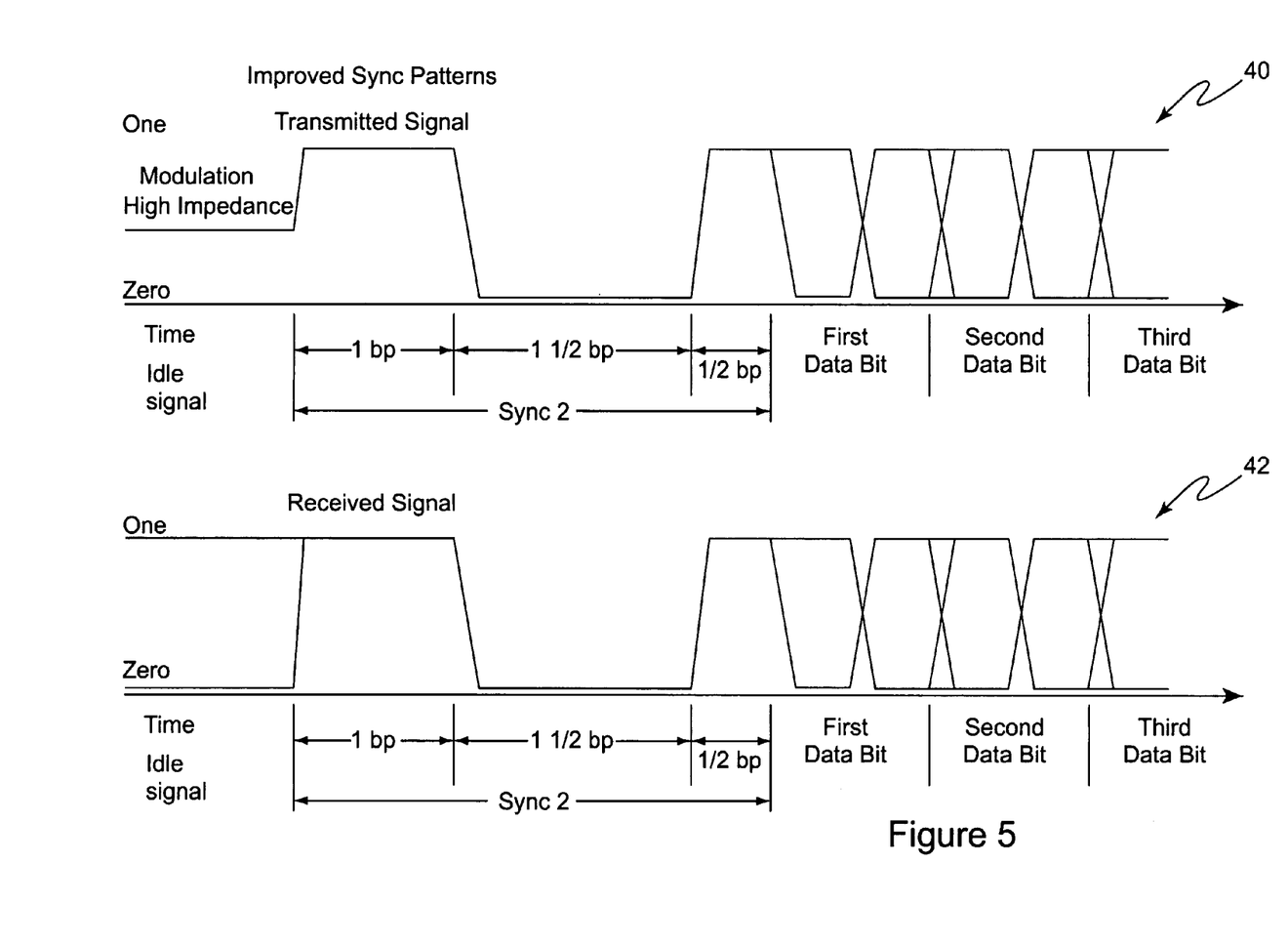

FIGS. 4 and 5 illustrate-sync patterns in accordance with various embodiments of the present invention for use with Manchester encoding. With reference to FIG. 4, there is shown waveforms 30, 32 illustrating sync patterns in accordance with the present invention for use with Manchester encoding where the sync pattern is detected when the received signal goes low for 1 bit period, followed by the received signal going high for 1½ bit periods, followed by the received signal going low for ½ bit period. In FIG. 5 there is shown sync patterns in accordance with the present invention for use with Manchester encoded signals where the sync pattern is detected when the received signal goes high for 1 bit period, followed by the received signal going low for 1½ bit periods, followed by the sync pattern going high for ½ bit period.

Thus, it will be noted that in comparing the prior art sync patterns with those of the invention, the sync patterns of the invention have additional transitions between low and high. While the prior art sync patterns have three (3) such transitions, the sync patterns in accordance with preferred embodiments of the invention have four (4) such transitions. The additional transition allows the receiver/transmitter to correctly identify the sync pattern in the presence of greater frequency deviation between the transmitted and received signals. This is accomplished with the total periods of the sync patterns of the invention being no greater than the total periods of the traditional sync patterns.

Figure 6:
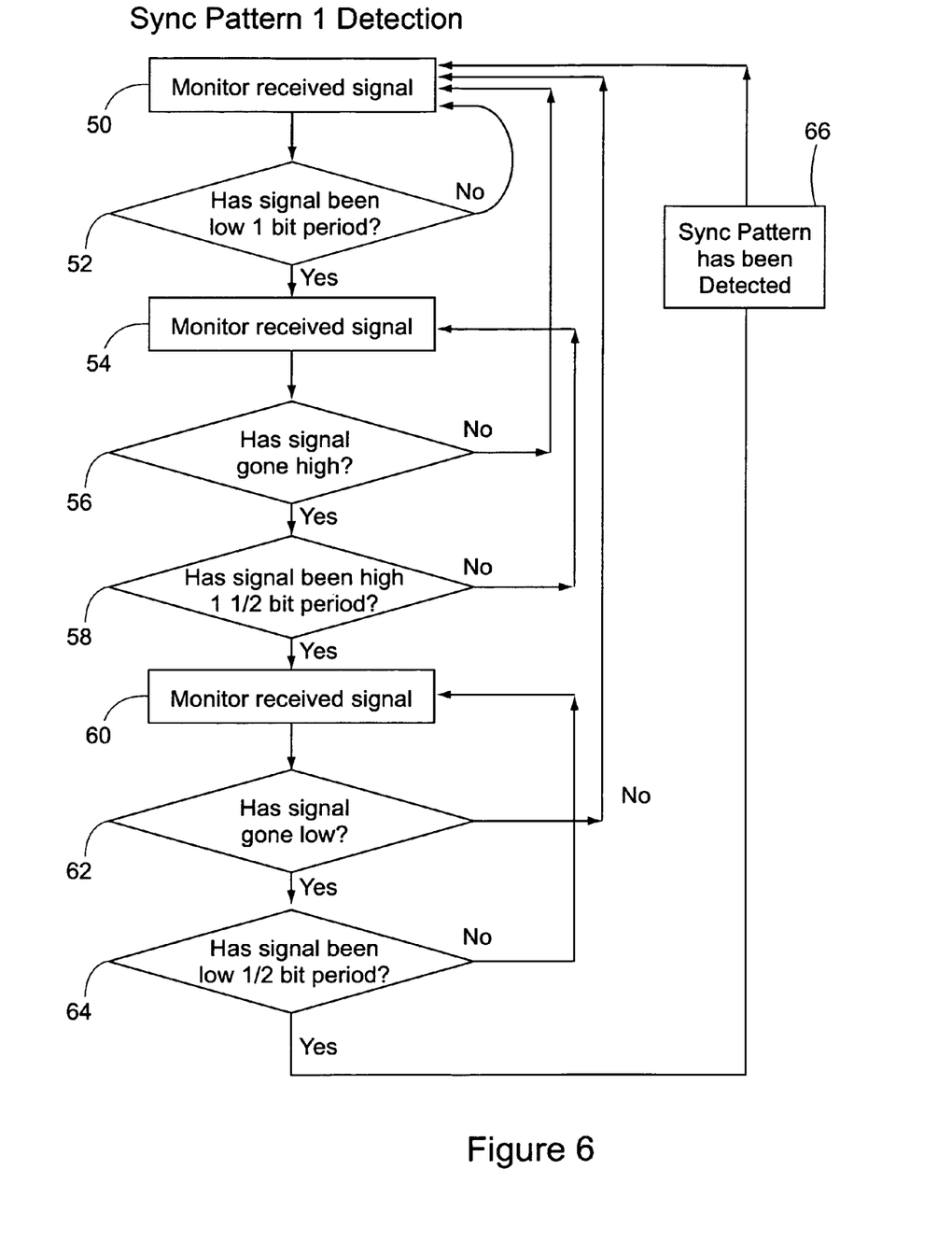
FIGS. 6 and 7 are flow diagrams of the software implementing the sync patterns of FIGS. 4 and 5, respectively.

The method of detecting the sync patterns in accordance with preferred embodiments of the invention as shown by the waveforms of FIGS. 4 and 5 will be further described with reference to the flow diagrams of FIGS. 6 and 7. FIG. 6 is a flow diagram for detecting the sync pattern of FIG. 4. A receiver/transmitter in the network monitors (50) the received signal and determines (52) whether the received signal has gone low for 1 bit period. If so, the received signal continues to be monitored (54) to determine if it goes high at the conclusion of 1 bit period (56), and whether it then remains high for 1½ bit periods (58). If both of these criteria are met, i.e., the received signal went low for 1 bit period, followed by going high for 1½ bit periods, the signal is monitored (60) to determine if it then goes low (62), and if so, if it goes low for ½ bit periods (64). If all three criteria are met, i.e., the received signal goes low for 1 bit period, followed by going high for 1½ bit periods, followed by going low for ½ bit period, the sync pattern is detected (66).

Figure 7:
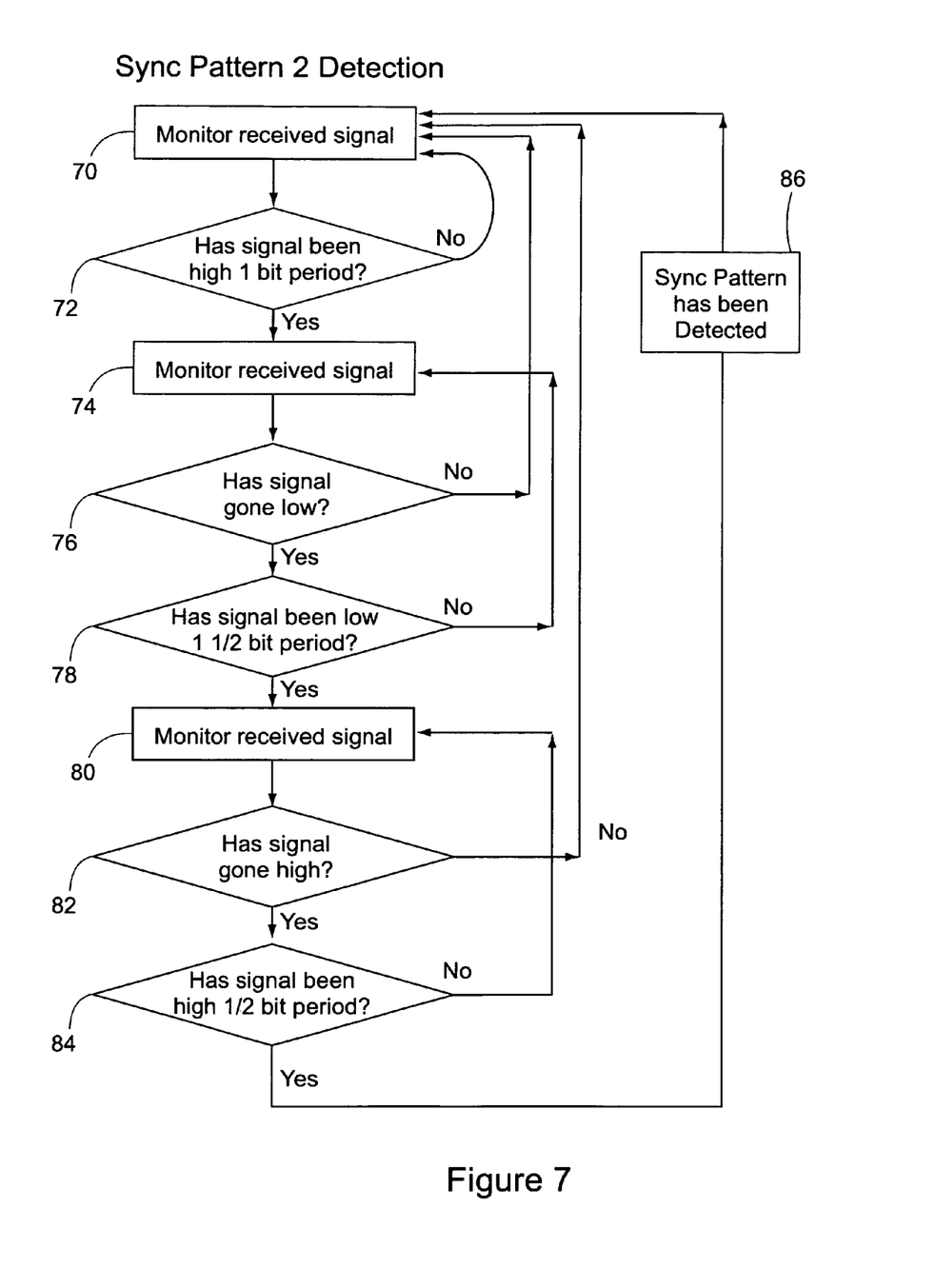

FIG. 7 is a flow diagram for detecting the sync pattern of FIG. 5. A receiver/transmitter in the network monitors (70) the received signal and determines (72) whether the received signal has gone high for 1 bit period. If so, the received signal continues to be monitored (74) to determine if it goes low at the conclusion of 1 bit period (76), and whether it remains low for 1½ bit periods (78). If both of these criteria are met, i.e., the received signal went high for 1 bit period, followed by going low for 1½ bit periods, the signal is monitored (80) to determine if it then goes high (82), and if so, if it goes high for ½ bit period (84). If all three criteria are met, i.e., the received signal goes high for 1 bit period, followed by going low for 1½ bit periods, followed by going high for ½ bit period, the sync pattern is detected (86).

Figure 8:
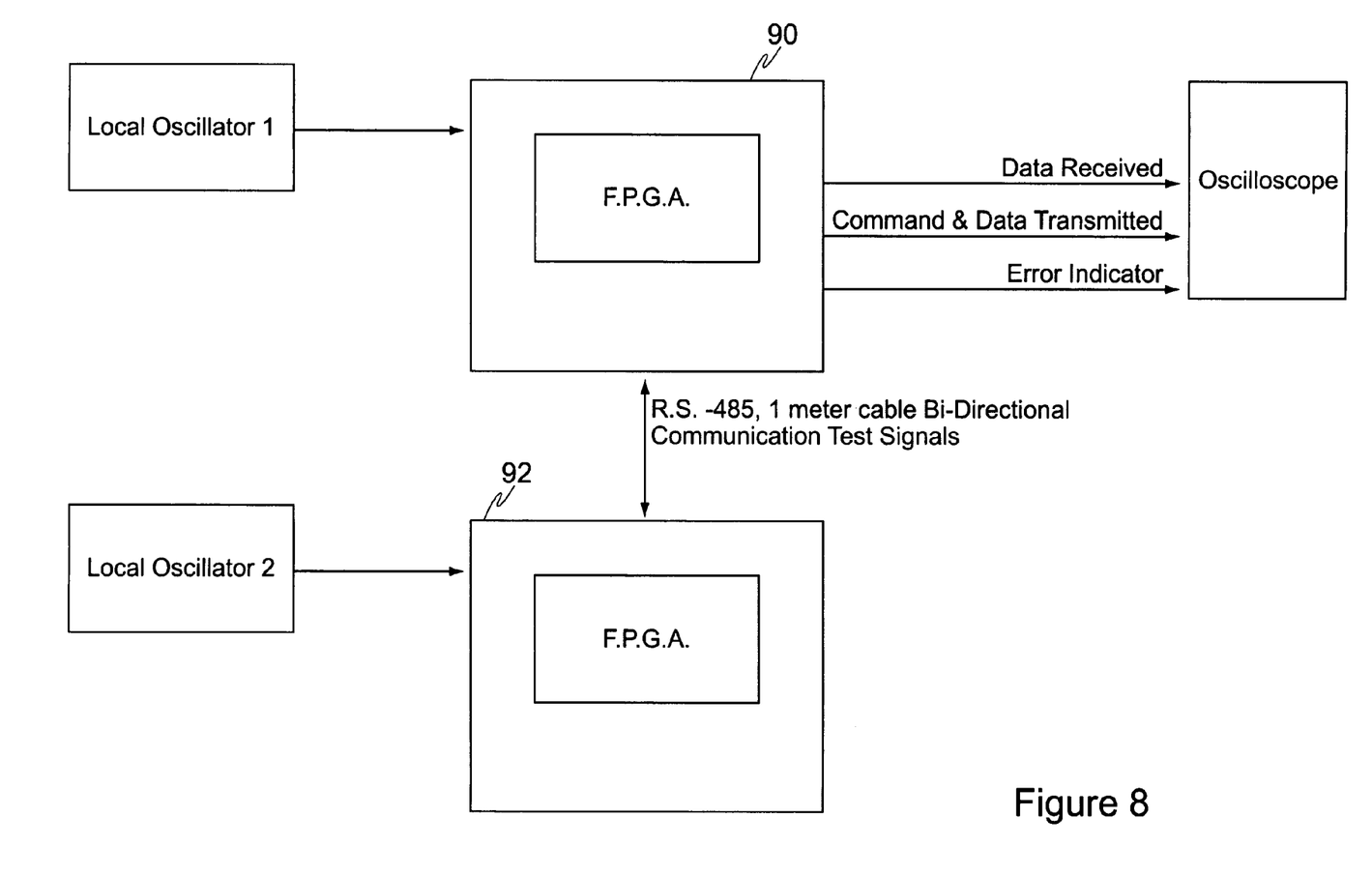
FIG. 8 is a block diagram of a test set-up for measuring frequency deviation tolerance.

With reference to FIG. 8, closed loop tests were conducted to find the frequency deviation that could be tolerated in a network. The test comprised a node 90 on an RS-485 bus generating a command word with a sync pattern 40/42 and 18 data bits including a parity bit, then a data word with a sync pattern 30/32 and 18 data bits, including parity bit. A second node 92 received the command word and data word, and if both were received properly, transmitted the data word back to the first node. The first node received the data word and compared it with the word it sent. If they matched no error indication was generated. If there was a mismatch or missing reply the first node generated an error indication. The frequency of local oscillator 1 for node 90 was set at a nominal 6 MHz. These tests showed that with 6 times oversampling asynchronous receivers using the traditional sync patterns, the local oscillator 2 for node 92 could be varied from 5.50 MHz (−8.33%) to 6.547 Mhz (+9.11%) with no communication errors occurring. With 6 times oversampling asynchronous receivers using the sync patterns of the present invention, the local oscillator 2 could be varied from 5.40 MHz (−10.0%) to 6.750 MHz (+12.5%) with no communication errors occurring. Thus, the sync patterns of the invention allowed a worst case frequency deviation of the local oscillators between the two nodes to increase from 8.33% to 10% (a worst case frequency deviation allowance increase of about 20%).

When implementing digital logic to receive the Manchester encoded data stream there is a tradeoff between the local oscillator frequency and the performance of the receiver logic. The digital logic in the receiver can only sample the incoming data stream at a rate of 1/(local oscillator frequency=T). The digital logic uses these samples to find the edges in the data, and uses the edges to find the sync patterns and bit stream. The digital receiver logic therefore can only find the transitions in a waveform with an uncertainty of 1/T. The uncertainty is one factor that reduces the amount of local oscillator frequency mismatch from nominal that can be tolerated between the sending and receiving units. Ideally the digital logic in the receiver would use a local oscillator frequency that would be fast enough to sample the data stream at a rate of at least 10 times per bit or more to reduce the effects of the sampling uncertainty. However practical limitations on the frequency at which a digital receiver circuit can be operated typically limit the sampling rate. In accordance with preferred embodiments of the invention, a schematic based circuit used a sample rate of 6 samples per bit, and a VHDL based circuit used a sample rate of 10 samples per bit. When receiving a 30 Mbit/sec data stream the schematic based circuit used a 180 MHz local oscillator, and the VHDL based circuit used a 300 MHz local oscillator. The VHDL based circuit is contained in the computer program listing appendix to this specification.

While the present invention has been described by reference to specific embodiments and specific uses, it should be understood that other configurations and arrangements could be constructed, and different uses could be made, without departing from the scope of the invention as set forth in the following claims.

What is claimed is:

1. An electronic system for generating a data sync pattern for a network that utilizes Manchester (Bi-Phase) type signal encoding with an embedded sync pattern, the system comprising:
   a transmitter for generating said embedded sync pattern comprising a signal pattern of at least one of the patterns (a) and (b), where:
   pattern (a) begins with a first low signal of one bit period, followed by a high signal of 1½ bit periods, followed by a second low signal, and wherein a trailing edge transition from the high signal to second low signal creates a guaranteed transition ½ bit period prior to a start period for a data bit; and
   pattern (b) begins with a first high signal of one bit period, followed by a low signal of 1½ bit periods, followed by a second high signal, and wherein a trailing edge transition from the low signal to the second high signal creates a guaranteed transition ½ bit period prior to the start period for the data bit; and
   wherein portions of each of the patterns prior to and subsequent to said 1½ bit period both differ in duration from said 1½ bit period.

2. The system data sync pattern of claim 1, wherein said sync patterns have substantially no DC component, and wherein said second low signal and said second high signal each comprise pulses of ½ bit period in duration.

3. An electronic system for generating a data sync pattern for a network that utilizes Manchester (Bi-Phase) type signal encoding with an embedded sync pattern, comprising:
   a transmitter for generating said embedded sync pattern comprising a signal pattern of at least one of patterns (a) and (b), where:
   pattern (a) is a first low signal of 1 bit period, followed by a high signal of 1½ bit periods, followed by a second low signal of ½ bit period, a trailing edge transition from the high signal to the second low signal creates a guaranteed transition ½ bit period prior to a start period for a data bit; and
   pattern (b) is a first high signal of 1 bit period, followed by a low signal of 1½ bit periods, followed by a second high signal of ½ bit period, a trailing edge transition from the low signal to the second high signal creates a guaranteed transition ½ bit period prior to the start period for the data bit.

4. The system of claim 3, wherein said embedded sync pattern has substantially no DC component.

5. A method of synchronizing a data signal in a network that utilizes Manchester (Bi-Phase) type signal encoding, to enable detection of a sync pattern over an increased frequency bandwidth, said method comprising:
   using a transmitter to generate a data signal;
   using the transmitter to embed within said data signal a sync pattern comprising a signal pattern of at least one of patterns (a) and (b), where:
   pattern (a) is a first low signal having a duration of 1 bit period, followed by a high signal of 1½ bit periods, followed by a second low signal having a duration of ½ bit period, and wherein a trailing edge transition from said high signal to the second low signal creates a guaranteed transition ½ bit period prior to a start period for a data bit; and
   pattern (b) is a first high signal, followed by a low signal of 1½ bit periods, followed by a second high signal having a duration of ½ bit period, and wherein a trailing edge transition from said low signal to said second high signal creates a guaranteed transition ½ bit period prior to the start period for the data bit;
   using a receiver to detect at least one of said patterns.

6. The method of claim 5, wherein said sync patterns have substantially no DC component.

7. A method of synchronizing a data signal in a network that utilizes Manchester (Bi-Phase) type signal encoding, to enable detection of a sync pattern over an increased frequency bandwidth, said method comprising:
   using a transmitter to embed within said data signal a sync pattern comprising a signal pattern of at least one of patterns (a) and (b), where:
   pattern (a) is a first low signal of 1 bit period, followed by a high signal of 1½ bit periods, followed by a second low signal of ½ bit period, a trailing edge transition from the said high signal to the second low signal creating a guaranteed transition ½ bit period prior to a start period for a data bit; and
   pattern (b) is a first high signal of 1 bit period, followed by a low signal of 1½ bit periods, followed by a second high signal of ½ bit period, a trailing edge transition from the low signal to the second high signal creating a guaranteed transition ½ bit period prior to the start period for the data bit; and
   using a receiver to detect at least one of said patterns.

8. The method of claim 7, wherein said sync patterns have substantially no DC component.

9. A data network for transmitting a sync signal that is detectable over an increased frequency bandwidth, the network comprising:
   a plurality of data transmitters/receivers connected in said network utilizing a Manchester (Bi-Phase) type signal encoded messaging format with an embedded sync pattern, and wherein a transmitter portion of at least one of said transmitter/receivers generates the sync pattern, and wherein the sync pattern comprises a signal pattern of at least one of patterns (a) and (b), where:
   pattern (a) is a first low signal, followed by a high signal of 1½ bit periods, followed by a second low signal having a duration of ½ bit period, and a trailing edge transition from the said high signal to the second low signal creating a guaranteed transition ½ bit period prior to a start of a data bit; and
   pattern (b) is a first high signal, followed by a low signal of 1½ bit periods, followed by a second high signal having a duration of ½ bit period, and wherein a trailing edge transition from the said low signal to the second high signal creates a guaranteed transition ½ bit period prior to the start of a data bit, and
   each said transmitter/receiver comprising a detector for detecting at least one of said patterns.

10. The data network of claim 9, wherein said sync patterns have substantially no DC component.

11. A data network for transmitting a sync signal that is detectable over an increased frequency bandwidth, the network comprising:
   a plurality of data transmitters/receivers connected in said network utilizing a Manchester (Bi-Phase) type signal encoded messaging format with an embedded sync pattern, said embedded sync pattern comprising a signal pattern of at least one of patterns (a) and (b), where:

pattern (a) is a first low signal of 1 bit period, followed by a high signal of 1½ bit periods, followed by a second low signal of ½ bit period, a trailing edge transition from the said high signal to the second low signal creating a guaranteed transition ½ bit period prior to a start period for a data bit; and pattern (b) is a high signal of 1 bit period, followed by a low signal of 1½ bit periods, followed by a second high signal of ½ bit period, a trailing edge transition from the low signal to the second high signal creating a guaranteed transition ½ bit period prior to the start period for the data bit, and each said transmitter/receiver comprising a detector for detecting at least one of said patterns.

12. The data network of claim 11, wherein said sync patterns have substantially no DC component.

* * * * *